United States Patent
Hill

(10) Patent No.: US 10,430,139 B2
(45) Date of Patent: Oct. 1, 2019

(54) SYSTEMS AND METHODS FOR MANAGING MULTIPLE INDEPENDENT DATALINK DISPLAYS

(71) Applicant: Honeywell International Inc., Morris Plains, NJ (US)

(72) Inventor: Kathryn Bates Hill, Milton-Freewater, OR (US)

(73) Assignee: Honeywell International Inc., Morris Plains, NJ (US)

( * ) Notice: Subject to any disclaimer, the term of this patent is extended or adjusted under 35 U.S.C. 154(b) by 405 days.

(21) Appl. No.: 14/940,104

(22) Filed: Nov. 12, 2015

(65) Prior Publication Data

US 2017/0139660 A1    May 18, 2017

(51) Int. Cl.
| | |
|---|---|
| G06F 3/14 | (2006.01) |
| G06F 1/16 | (2006.01) |
| G06F 3/0483 | (2013.01) |
| G06F 3/147 | (2006.01) |
| G06F 3/0484 | (2013.01) |
| G06F 17/24 | (2006.01) |

(Continued)

(52) U.S. Cl.
CPC ........... *G06F 3/1423* (2013.01); *B60K 35/00* (2013.01); *G06F 3/0483* (2013.01);
(Continued)

(58) Field of Classification Search
None
See application file for complete search history.

(56) References Cited

U.S. PATENT DOCUMENTS

| | | | |
|---|---|---|---|
| 4,698,752 A | 10/1987 | Goldstein et al. | |
| 5,835,601 A * | 11/1998 | Shimbo | G06F 17/24 |
| | | | 713/165 |

(Continued)

FOREIGN PATENT DOCUMENTS

| | | |
|---|---|---|
| WO | 2011017063 | 2/2011 |
| WO | 2014168566 | 10/2014 |

OTHER PUBLICATIONS

European Patent Office, "Extended European Search Report for EP Application No. 16196478.8", "from Foreign Counterpart for U.S. Appl. No. 14/940,104", dated Mar. 23, 2017, pp. 1-7, Published in: EP.

(Continued)

Primary Examiner — Nhat Huy T Nguyen
(74) Attorney, Agent, or Firm — Fogg & Powers LLC

(57) ABSTRACT

A system for managing multiple independent cockpit displays, comprising: first and second displays configured to receive input and display pages, the pages defined by parameters in a database; and a control system comprising a processor coupled to a memory storing the database, the processor configured to: receive a request to display a first page on the first display; retrieve a flag associated with the first page, the flag being a parameter in the database and indicating whether a page is safe or unsafe for simultaneous display and editing; retrieve group designators associated with the first page and a second page, the group designator being a parameter in the database, the group designator identifying related pages; and control display and editing of pages on the first display based on at least one of: the flag associated with the first page, and the group designators associated with the first and second pages.

16 Claims, 10 Drawing Sheets

(51) Int. Cl.
  *B60K 35/00*    (2006.01)
  *G06F 16/904*   (2019.01)

(52) U.S. Cl.
  CPC .......... *G06F 3/04842* (2013.01); *G06F 3/147* (2013.01); *G06F 3/1454* (2013.01); *G06F 16/904* (2019.01); *G06F 17/24* (2013.01); *B60K 2370/184* (2019.05); *B60K 2370/195* (2019.05); *B60K 2370/52* (2019.05); *G09G 2358/00* (2013.01); *G09G 2380/10* (2013.01)

(56) References Cited

U.S. PATENT DOCUMENTS

| | | | |
|---|---|---|---|
| 6,803,860 B1 | 10/2004 | Langner et al. | |
| 8,018,398 B1 * | 9/2011 | Harris | G06F 3/1431 345/1.1 |
| 8,484,576 B2 | 7/2013 | Berson et al. | |
| 8,694,184 B1 | 4/2014 | Boorman et al. | |
| 9,565,176 B2 * | 2/2017 | Goyal | H04L 63/0492 |
| 9,836,111 B2 * | 12/2017 | Lee | G06F 1/32 |
| 2007/0016650 A1 | 1/2007 | Gilbert et al. | |
| 2011/0169755 A1 * | 7/2011 | Murphy | G06F 3/1423 345/173 |
| 2011/0270992 A1 | 11/2011 | Judd et al. | |

OTHER PUBLICATIONS

European Patent Office, Communication Pursuant to Article 94(3) from EP Application No. 16196478.8, Foreign Counterpart to U.S. Appl. No. 14/940,104, dated Sep. 11, 2018, pp. 1-5, Published: EP.

* cited by examiner

SYSTEMS AND METHODS FOR MANAGING MULTIPLE INDEPENDENT DATALINK DISPLAYS

BACKGROUND

Crew members of an aircraft conduct airline operational communications (AOC), Air Traffic Control (ATC) communications, and Flight Management System (FMS) communications via datalink through displays in the cockpit of the aircraft. Current displays are dynamic and provide prompt questions for the crew to enter information. AOC includes: the collection of aircraft information and status; entry of information by the crew; and communication of the information to airline operations maintenance, and other airline services. In order to improve efficiency, aircraft are equipped with multiple displays so more than one member of the crew may enter information or perform AOC, ATC, or FMS communications at the same time. The most common operation is for different crew members to work on different pages that are unrelated. However, when the crew does not discuss the pages that are currently being worked on, some problems can arise. For example, allowing multiple members of the crew to access or edit pages at the same time causes a crew member to see live editing of the document that is not performed by that particular crew member. Also, inconsistent information may be entered in the page such that the crew members could interfere with each other's work. These problems cause confusion and safety issues for the crew. Further, the problems can reduce the efficiency of the crew.

Placing a restriction on all pages so only one crew member may access a page at a time is not adequate for optimal operation by the crew. For example, certain pages include operations that involve requesting information (e.g., weather data) or communicating through text messages. These pages may be accessed simultaneously by the crew without complication, so a rigid locking mechanism that prevents simultaneous use of these pages is undesirable.

For the reasons stated above and for other reasons stated below which will become apparent to those skilled in the art upon reading and understanding the specification, there is a need in the art for improved systems and methods for managing multiple independent displays for a vehicle.

SUMMARY

The embodiments of the present disclosure provide systems and method for managing multiple independent displays in the cockpit of an aircraft or other vehicle and will be understood by reading and studying the following specification.

In one embodiment, a system for managing multiple independent cockpit displays comprises a first display device and a second display device in a cockpit of a vehicle, wherein the first display device and the second display device are configured to receive input from a user and display pages to the user, wherein the pages are pre-defined by a plurality of parameters in a page definition database. The system also includes a display device control system comprising a processor coupled to a memory, wherein the memory stores the page definition database. The processor is configured to receive a request from a user to display a first page on the first display device; retrieve a flag associated with the first page, wherein the flag is a pre-defined parameter in the page definition database, wherein the flag indicates whether a particular page is safe or unsafe for simultaneous display and editing on two or more display devices; retrieve a group designator associated with the first page and a group designator associated with a second page displayed on a second display device, wherein the group designator is a pre-defined parameter in the page definition database, wherein the group designator identifies pages that are related to one another; and control display and editing of pages on the first display device in response to the request based on at least one of: the flag associated with the first page, the group designator associated with the first page, and the group designator associated with the second page.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
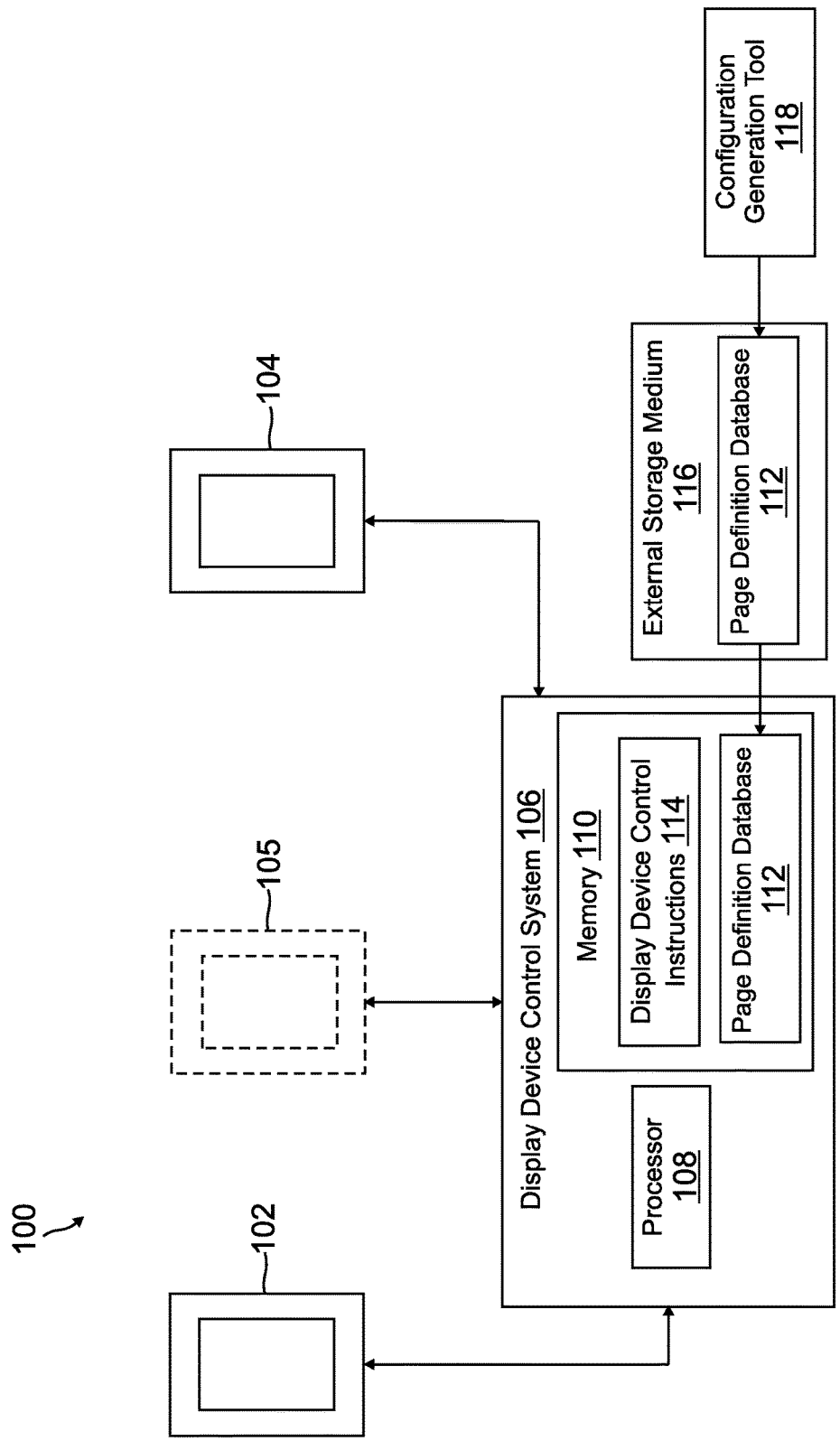
FIG. 1 is a block diagram of an example system for managing multiple independent cockpit display devices according to one embodiment of the present disclosure.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The embodiments described herein provide systems and methods for managing multiple independent displays in the cockpit of an aircraft or other vehicles such as but not limited to ground, sea, or space vehicles. The embodiments described herein include two or more display devices in the cockpit of a vehicle and a display device control system that controls the display and editing of pages on the two or more display devices. The display device control system allows individual vehicle fleet owners or fleet operators to designate which pages are "safe" for simultaneous display and editing on multiple display devices and those that are "unsafe" for simultaneous display and editing on multiple display devices. In particular, the display device control system includes customizable flags and designators in a page definition database used to define each page displayed on the multiple independent displays. As the term is used herein, it should be appreciated that a "cockpit" refers to the vehicle control station from which a driver, pilot, or crew operates and/or directs operation of the vehicle.

FIG. 1 is example embodiment of a system 100 that includes multiple independent cockpit displays. System 100 generally includes two display devices 102, 104 and a display device control system 106. The display device control system 106 generally includes at least one processor 108 coupled to a memory 110, the memory 110 storing a page definition database 112 and executable display device control instructions 114. In exemplary embodiments, the system 100 optionally includes a third display device 105. While three display devices are shown in FIG. 1, it should be understood that this is for ease of illustration and the teachings of the present disclosure could be applied to a system with more than three display devices.

Each display device 102, 104 is located in the cockpit and operates independently from other display devices. In exemplary embodiments, the display devices 102, 104 each comprise a control display device (CDU), a multifunction control and display device (MCDU), a multi-input interactive display device (MIDU), a multi-function display (MFD), or the like. In addition to displaying system generated messages, each display 102, 104 can display various uplink, downlink, and sidelink messages. The display devices 102, 104 enable a user (e.g. crew member) to navigate an onscreen menu structure to respond to messages, enter data, or request information.

Each display device 102, 104 is configured to receive input from a user and display information to the user. In exemplary embodiments, the information displayed to the user on the display devices 102, 104 includes pages defined in the page definition database 112. In exemplary embodiments, each page is defined by various parameters or configuration information in the page definition database 112, which is a code structure including tables, arrays, variables, flags, and the like. In exemplary embodiments, the parameters include a combination of fixed text, variable data, actions, fields for data entry, selection keys, and the like. In exemplary embodiments, the actions may be simple or complex. A simple action can include, for example, entering data, displaying another page, or sending a message. A complex action can include, for example, a set of logic to calculate data, logic to conditionally perform actions depending on data values or previous line select key actions, logic to trigger future actions, and set flags that will be used to cause other actions (e.g. dynamic screen functions). In exemplary embodiments, the page definition database 112 is configured by an aircraft/fleet operator, a conglomeration of airlines, an organization, a pilot, a flight crew, a maintenance crew, or the like.

In exemplary embodiments, the page definition database 112 is loaded into memory 110 on display device control system 106 from an external storage medium 116 that exists externally to display device control system 106. In exemplary embodiments, the page definition database 112 is loaded into memory 110 via a data loader, datalink/uplink, through remote access, or using other methods known to one having skill in the art. In at least one example, external storage medium 116 is an appropriate non-transitory storage media, such as flash or other non-volatile memory, magnetic disc drives, and/or optical disc drives. External storage medium 116 stores the page definition database 112 so that a vehicle can access external storage medium 116 to acquire the page definition database 112. For example, a fleet having a fleet specific configuration, stores the page definition database 112 in external storage medium 116 that exists externally to display device control system 106, where external storage medium 116 is accessible by multiple vehicles. For example, external storage medium 116 is stored on a server that is controlled by a fleet operator. In an alternative implementation, page definition database 112 is distributed on a disk, a USB drive, or the like for loading of the page definition database 112 onto individual display device control systems 106. In exemplary embodiments, each vehicle associated with a particular fleet requiring the same page definition database 112 has the page definition database 112 loaded into memory on the display device control system 106.

In certain embodiments, a configuration generation tool 118 creates the page definition database 112 stored in external storage medium 116. Configuration generation tool 118 is a tool that is operated by the fleet or a third party that creates page definition database 112 that is commonly shared among multiple vehicles within a fleet or other group. For example, a fleet uses configuration generation tool 118 such as a ground based software tool or a reconfiguration tool to create the page definition database 112 stored in external storage medium 116. The configuration generation tool 118 defines the parameters or configuration information of the page definition database 112. By controlling multiple aspects of the page definition database 112 available through external storage medium 116, the configuration generation tool 118 allows an organization to configure the control of communications through multiple independent display devices on individual vehicles in the fleet.

In exemplary embodiments, the display device control system 106 can be implemented in a flight management system (FMS), a communication management function (CMF), or another independent system in a vehicle. The processor 108 includes or functions with software programs, firmware, or other computer readable instructions for carrying out various methods, process tasks, calculations, and controls functions, which are used in managing multiple independent display devices in the cockpit of a vehicle.

The display device control system 106 is configured to control how pages are displayed on the display devices. In particular, the display device control system 106 controls the pages that are displayed on the display devices using the parameters in the page definition database 112 and input from the user. The display device control system 106 ensures that the confusing interactions discussed above do not occur with the two or more display devices of system 100. Since the page definition database 112 used to define the pages is not a relational database, methods of locking access to files in a relational database are not effective in the context of system 100. Further, the page definition database 112 does not directly identify which data elements control underlying actions on particular pages and the data relationships in the page definition database 112 do not enable knowledge as to how messages generated by the system 100 will be used by a ground system that receives them.

In exemplary embodiments, system 100 includes a flag in the page definition database 112 for designating the availability of each page for simultaneous display and editing. In exemplary embodiments, a flag in the page definition database 112 allows the person or entity (e.g. airline, pilot, third party, etc.) configuring the page definition database 112 to designate whether a particular page is safe or unsafe for simultaneous display and editing on two or more display devices prior to operation of the system. In other words, the flag is a pre-defined parameter in the page definition database 112. In exemplary embodiments, the designation of a page as being safe or unsafe is a subjective designation by the person or entity that configures the page definition database 112. Example criteria that can be used for this designation includes, but is not limited to, the content of the page, the safety critical nature of the information entered on the page, the number of interactions with other pages, and safety regulations or standards. In some embodiments, the flag associated with a respective page is a variable that indicates the state of the respective page with regard to simultaneous display and editing.

In exemplary embodiments, a page designated as safe has few interactions with other pages or has no input by users. For example, a safe page could include a page for requesting weather information or text messaging with the fleet control. A safe page would be fully available for display and editing by the two or more display devices without restriction. Thus, safe pages are always available for simultaneous independent display and editing for multiple crew members.

In exemplary embodiments, a page designated as unsafe generally has many complex interactions with other pages. In an example, an unsafe page could include load sheet data processing or takeoff data. In some embodiments, an unsafe page would not be available for simultaneous independent display and editing by multiple crew members on different displays. In other embodiments, it may be desirable to allow simultaneous display of an unsafe page, but to restrict the ability to interact with or edit the page. For example, it may be desirable to mirror a page on the multiple displays in the cockpit, so one of the crew members can verify the work of another. In such embodiments, the second crew member to access the page would be restricted to only viewing the page. By including this flag in the page definition database 112, undesirable results from simultaneously displaying and/or editing pages can be avoided.

A system that prevents simultaneously displaying and/or editing of a single unsafe page could still be susceptible to confusing interactions because unsafe pages can have interactions with other pages. To further prevent confusing interactions, the page definition database 112 also includes a group designator for each unsafe page that comprises a group designation associated with each respective unsafe page. In exemplary embodiments, the group designator can be a group identifier number, letter, or the like that corresponds to a group of unsafe pages that are related to one another. The group designator provides the ability for the person or entity configuring the page definition database 112 to identify which unsafe pages are related to one another. In exemplary embodiments, pages that are related to one another include, but are not limited to, pages that interact with one another, pages that share data, and pages related to the same stage of navigation. For example, a group of pages that each include fields for inputting runway data could be designated as belonging to the same group, i.e. same group designator. In exemplary embodiments, the group designation of an unsafe page is a subjective designation by the person or entity that configures the page definition database 112. In some embodiments, a single unsafe page can have more than one group designator when it is related to multiple groups of pages.

The display device control system 106 uses the group designator to prevent related unsafe pages from being displayed and edited simultaneously on multiple display devices. The group designator also allows unrelated unsafe pages to be displayed and edited simultaneously on multiple display devices. This provides more flexibility for the display device control system 106 than just preventing access to different unsafe pages by different users under all circumstances. In particular, different users can access different unsafe pages that are unrelated to one another, i.e. having a different group designator, because there is no risk of the confusing or dangerous interactions discussed above.

Figure 2A:
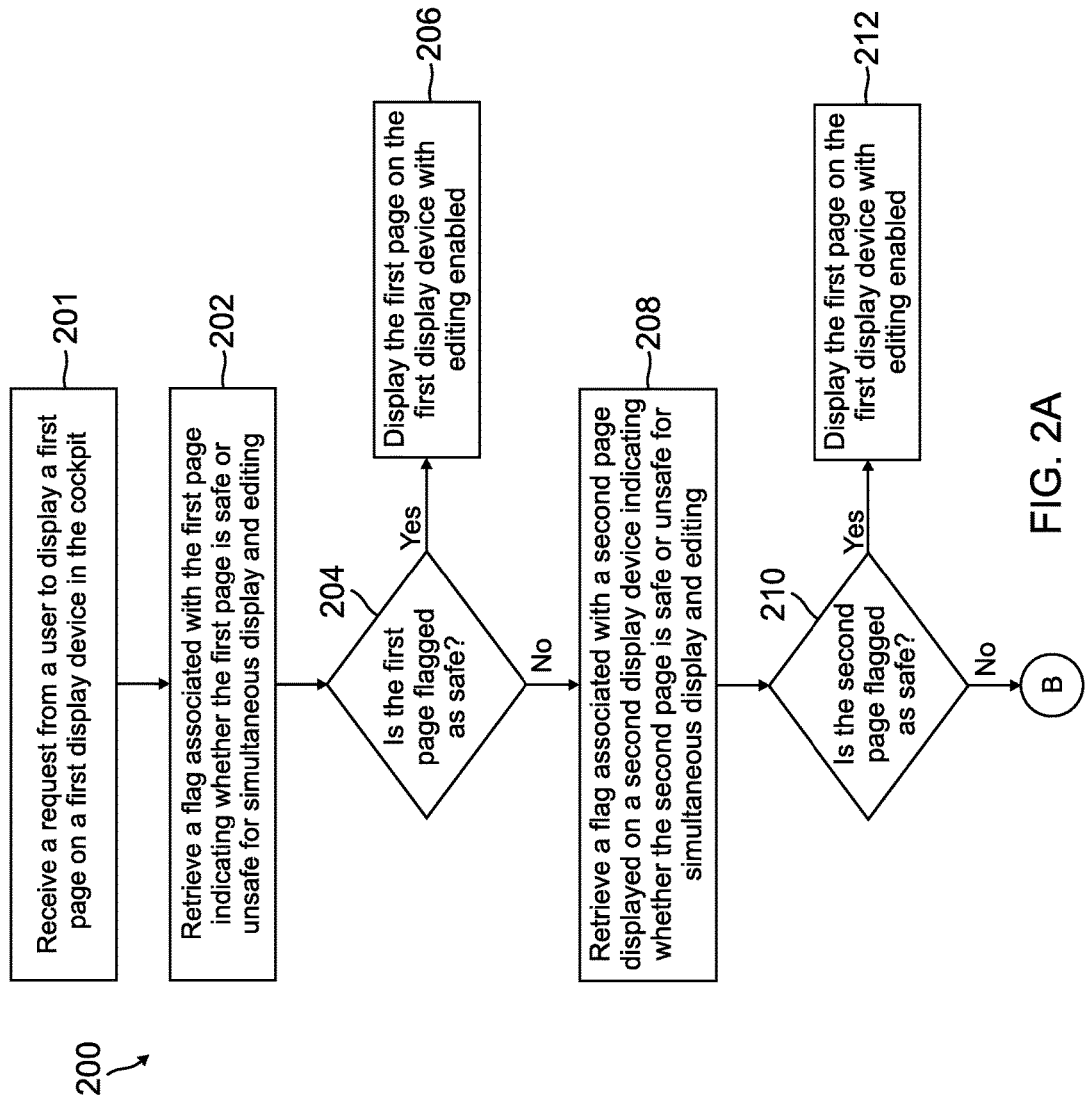
FIGS. 2A-2B illustrate a flow chart of exemplary logic executed by a display device control system for controlling two display devices according to one embodiment of the present disclosure.
Figure 2B:
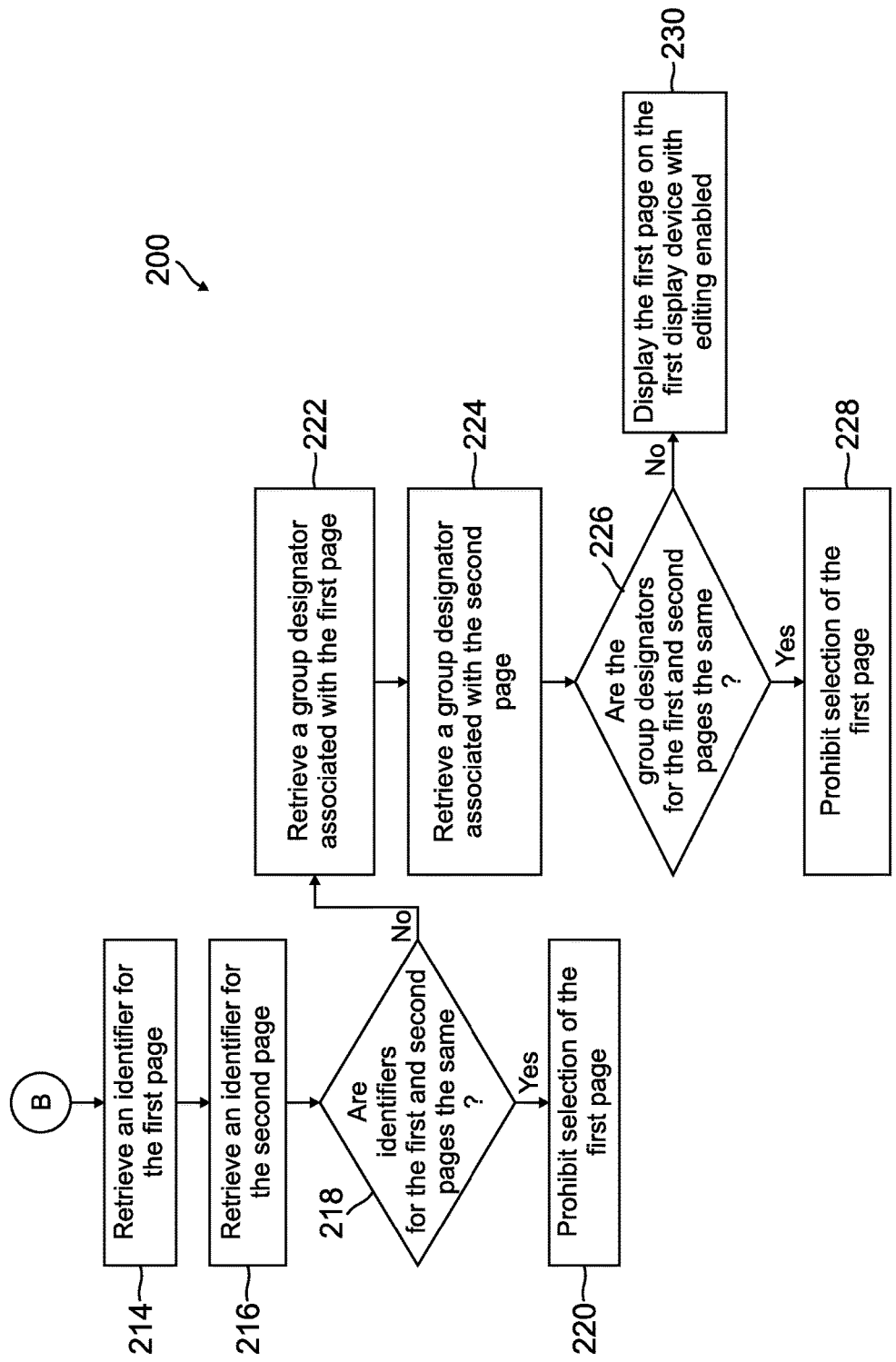

FIGS. 2A-2B include a flow chart illustrating a display device control algorithm 200 of one embodiment of the present disclosure. It should be understood that algorithm 200 may be implemented using any one of the embodiments described above in FIG. 1. As such, elements of algorithm 200 may be used in conjunction with, in combination with, or substituted for elements of the embodiments described above. Further, the functions, structures and other description of elements for such embodiments described above may apply to like named elements of algorithm 200 and vice versa.

In exemplary embodiments, algorithm 200 is for controlling two display devices as performed by the processor 108 executing the display device control instructions 114 in FIG. 1. The two display devices include a first display device 102 and a second display device 104. In some embodiments, one or more of the steps discussed herein with respect to algorithm 200 may be omitted for optimization.

At 201, the display device control system 106 receives a request from a user to display a first page on a first display device 102 in the cockpit. In exemplary embodiments, a user can request to display a page by entering information in a field, selecting a key, or the like.

The algorithm 200 proceeds to 202 with retrieving a flag associated with the first page indicating whether the first page is safe or unsafe for simultaneous display and editing on two or more display devices. At 204, the algorithm 200 determines whether the flag indicates that the first page is safe for simultaneous display and editing on two or more display devices. When the first page is flagged as safe, then the algorithm 200 proceeds to 206 and the processor 108 displays the first page on the first display device 102 with editing enabled.

When the first page is flagged as unsafe, the algorithm 200 proceeds to 208 with retrieving a flag associated with a second page displayed on the second display device 104 indicating whether the second page is safe or unsafe for simultaneous display and editing on two or more display devices. At 210, the algorithm 200 determines whether the flag associated with the second page indicates that the second page is safe for simultaneous display and editing on two or more display devices. When the second page is flagged as safe, then the algorithm 200 proceeds to 212 and the processor 108 displays the first page on the first display device 102 with editing enabled.

When the second page is flagged as unsafe, the algorithm 200 proceeds to 214, shown in FIG. 2B, with retrieving an identifier associated with the first page and 216 with retrieving an identifier associated with the second page. In exemplary embodiments, an identifier can include a word, number, letter, symbol, or the like that is used to identify or name a page. For example, the identifier for the main menu page of display devices used for AOC could be "AOC Menu." At 218, the algorithm 200 determines whether the identifiers associated with the first page and the second page are the same. In other words, the algorithm 200 determines whether the first page and the second page are the same page. When the identifiers associated with the first page and the second page are the same, then the algorithm 200 proceeds to 220 and the processor 108 prohibits selection of the first page. In exemplary embodiments, prohibiting selection comprises preventing display and editing of the first page on the first display device. In exemplary embodiments, prohibiting selection of the first page can include prohibiting display of the first page on the first display device 102, displaying an error indication on the first display device 102, displaying the first page on the first display device 102 with editing disabled, displaying the first page on the first display device 102 with at least one of a color and additional text indicating that the first page is unavailable for editing, or the like. In some embodiments, the error indication notifies the user that the requested page is in use.

When the identifiers associated with the first page and the second page are not the same, then the algorithm 200 proceeds to 222 with retrieving a group designator associated with the first page and 224 with retrieving a group designator associated with the second page. In exemplary embodiments, retrieving a group designator can include retrieving one group designator or a set of multiple group designators. At 226, the algorithm 200 determines whether the group designators associated with the first and second pages are the same. In other words, the algorithm 200 determines whether the first and second pages belong to the same group. In exemplary embodiments where a set of multiple group designators is retrieved, then determining whether the group designators associated with the first and second pages are the same includes determining whether any of the group designators associated with the first page are the same as any group designator associated with the second page. When the group designators associated with the first and second pages are the same, then the algorithm 200 proceeds to 228 and the processor 108 prohibits selection of the first page. When the group designators associated with the first and second pages are different, then the algorithm 200 proceeds to 230 and the processor 108 displays the first page on the first display device 102 with editing enabled.

Figure 3:
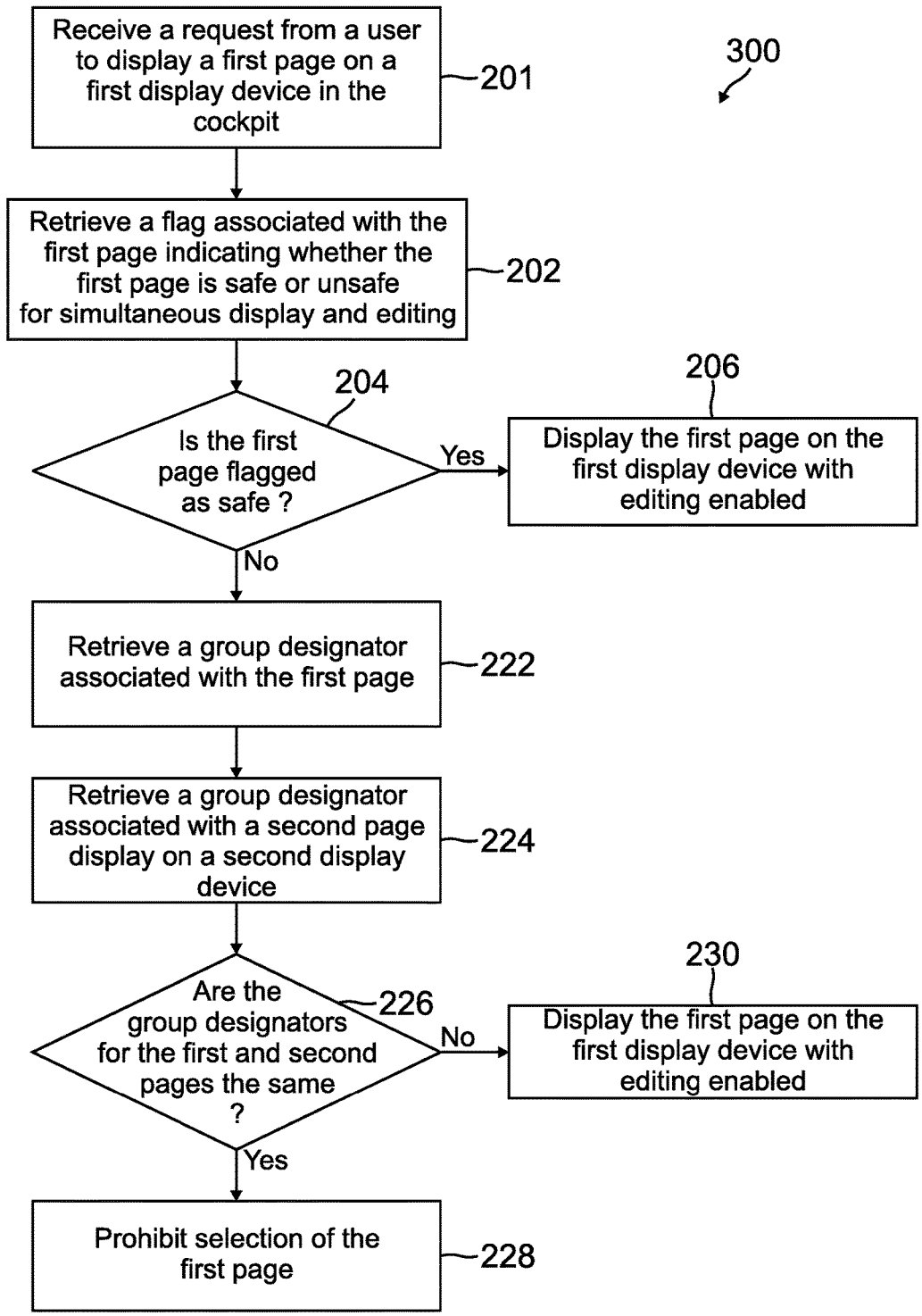
FIG. 3 illustrates a flow chart of exemplary logic executed by a display device control system for controlling two display devices according to one embodiment of the present disclosure.

FIG. 3 includes a flow chart illustrating a display device control algorithm 300 according to one embodiment of the present disclosure. It should be understood that algorithm 300 may be implemented using any one of the embodiments described above in FIGS. 1-2B. As such, elements of algorithm 300 may be used in conjunction with, in combination with, or substituted for elements of the embodiments described above. Further, the functions, structures and other description of elements for such embodiments described above may apply to like named elements of algorithm 300 and vice versa.

In exemplary embodiments, algorithm 300 is for controlling two display devices as performed by the processor 108 executing the display device control instructions 114 in FIG. 1. Algorithm 300 includes similar steps to algorithm 200 and the similar steps have the same reference numerals. However, when executing algorithm 300, the processor 108 omits steps 208-220 discussed above with respect to FIGS. 2A-2B. Accordingly, when the first page is flagged as unsafe, as determined at step 204, the algorithm 300 proceeds directly to 222-230 described above with respect to FIG. 2B. Algorithm 300 leverages that the information regarding the flag associated with the second page can be inferred based on the group designator associated with the second page. In particular, when the second page has the same group designator as the first page, then the second page must be flagged as unsafe. Further, the identifier associated with the second page may not provide any additional information necessary to determine whether or not the first page can be displayed.

Figure 4A:
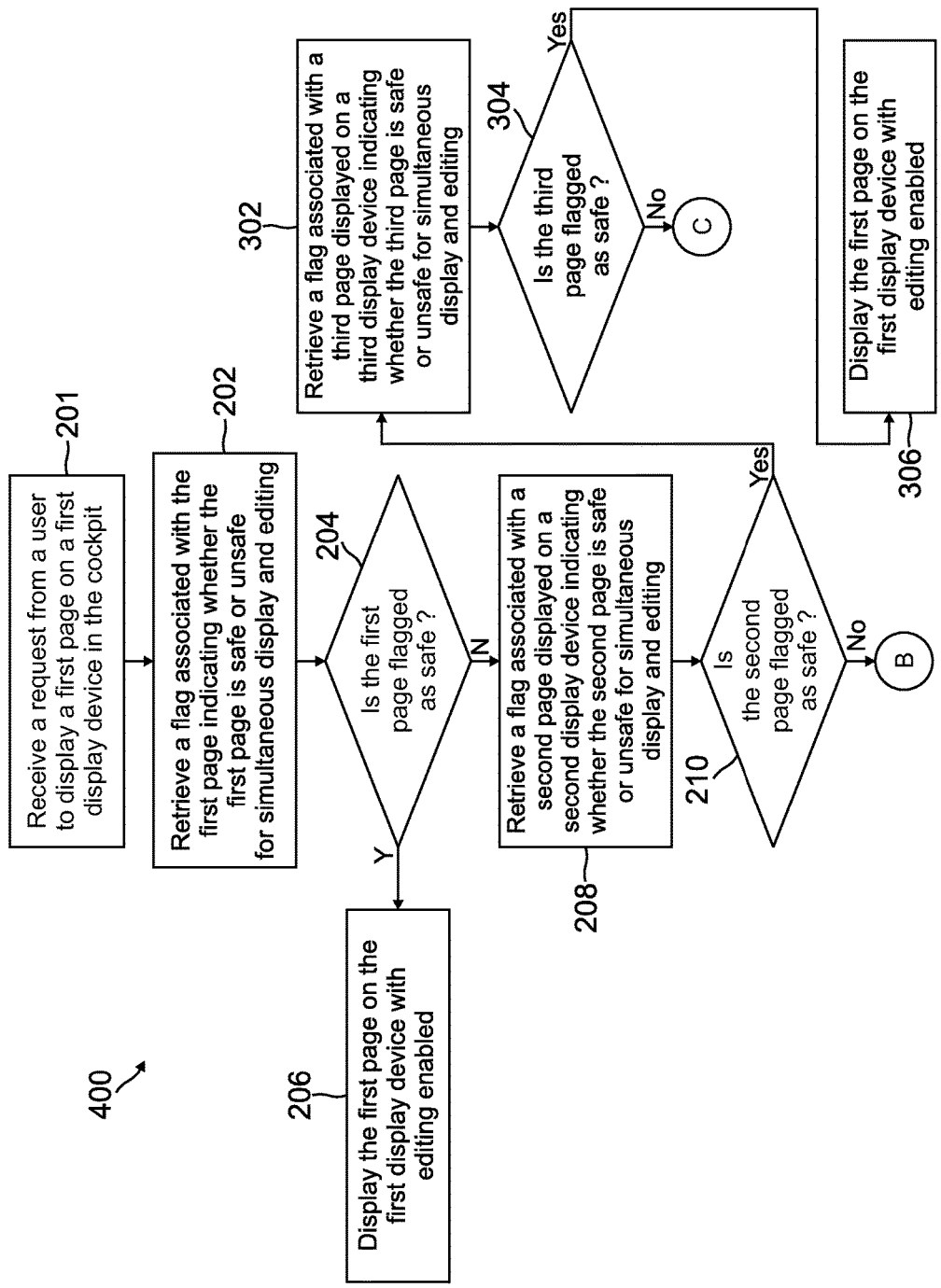
FIGS. 4A-4C illustrate a flow chart of exemplary logic executed by the display device control system for controlling three display devices according to one embodiment of the present disclosure.
Figure 4B:
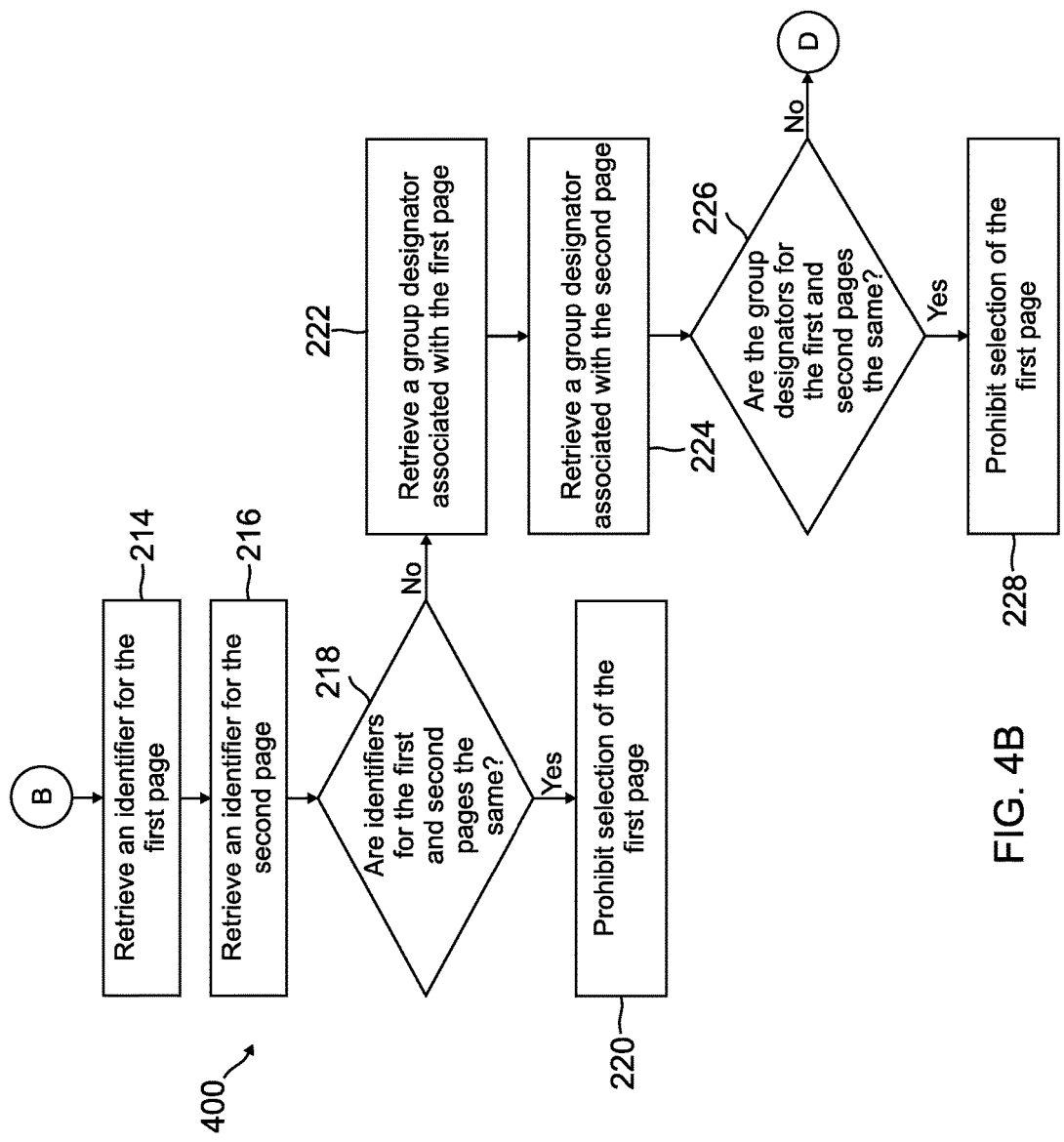
Figure 4C:
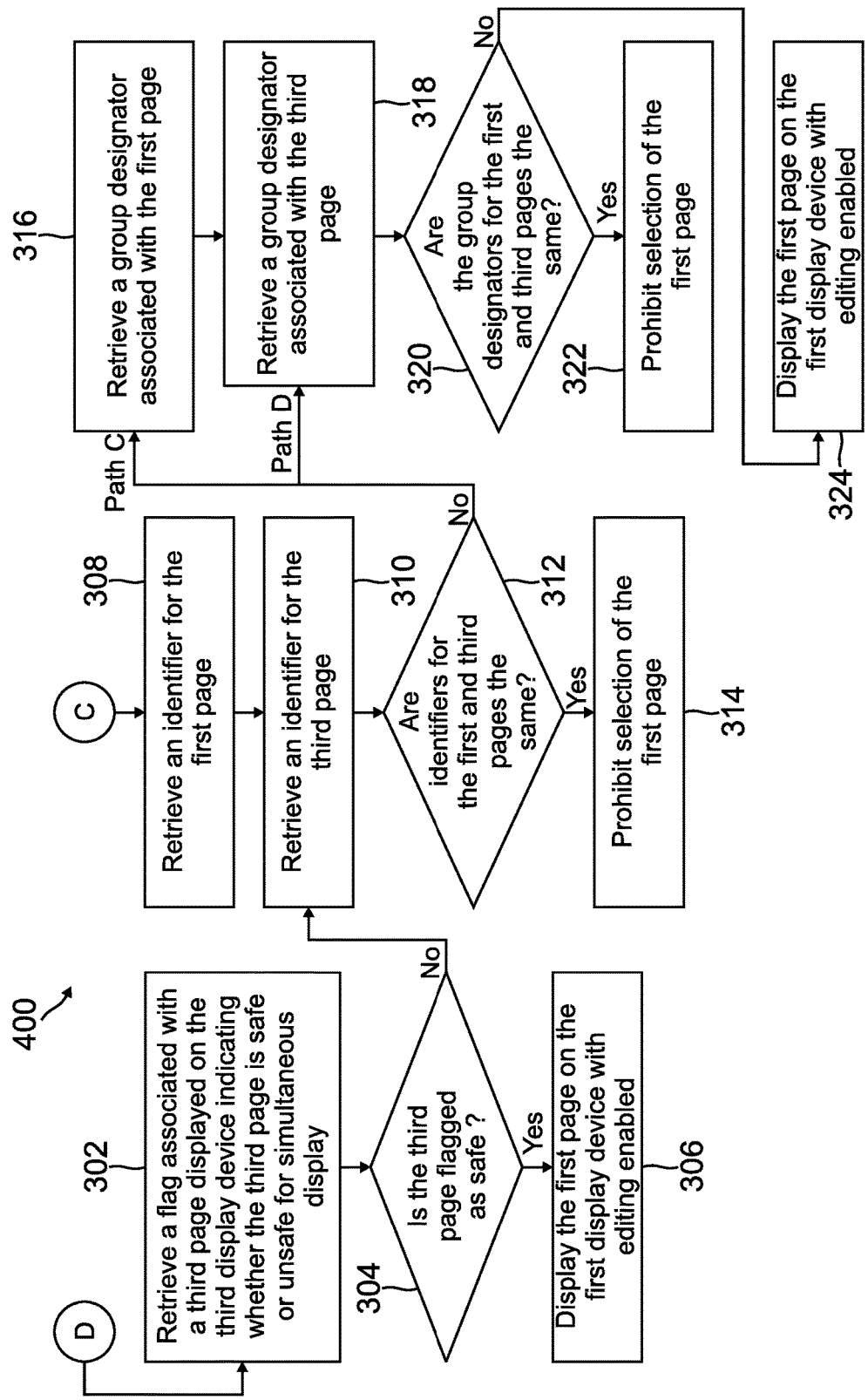

FIGS. 4A-4C include a flow chart illustrating a display device control algorithm 400 of one embodiment of the present disclosure. It should be understood that algorithm 400 may be implemented using any one of the embodiments described above in FIGS. 1-3. As such, elements of algorithm 400 may be used in conjunction with, in combination with, or substituted for elements of the embodiments described above. Further, the functions, structures and other description of elements for such embodiments described above may apply to like named elements of algorithm 400 and vice versa.

In exemplary embodiments, algorithm 400 is for controlling three display devices as performed by the processor 108 executing the display device control instructions 114 in FIG. 1. The three display devices include a first display device 102, a second display device 104, and a third display device 105. Algorithm 400 includes similar steps to algorithms 200, 300 and the similar steps have the same reference numerals. In some embodiments, one or more of the steps discussed herein with respect to algorithm 400 may be omitted for optimization.

At 201, the display device control system 106 receives a request from a user to display a first page on a first display device 102 in the cockpit. The algorithm 400 proceeds to 202 with retrieving a flag associated with the first page indicating whether the first page is safe or unsafe for simultaneous display and editing on two or more display devices. At 204, the algorithm 400 determines whether the flag indicates that the first page is safe for simultaneous display and editing on two or more display devices. When the first page is flagged as safe, then the algorithm 400 proceeds to 206 and the processor 108 displays the first page on the first display device 102 with editing enabled.

When the first page is flagged as unsafe, the processor 108 proceeds to 208 with retrieving a flag associated with a second page displayed on the second display device 104 indicating whether the second page is safe or unsafe for simultaneous display and editing on two or more display devices. At 210, the algorithm 400 determines whether the flag associated with the second page indicates that the second page is safe for simultaneous display and editing on two or more display devices. When the second page is flagged as safe, as determined at step 210, then the algorithm 400 proceeds directly to 302, as shown in FIG. 4A, without performing steps 214-228. When the second page is flagged as unsafe, the algorithm 400 proceeds with steps 214-228 as discussed above with respect to FIG. 2B. When the group designators associated with the first and second pages are not the same, as determined at step 226, then the algorithm 400 proceeds to steps 302-306, discussed herein.

At 302, the algorithm 400 proceeds with retrieving a flag associated with a third page displayed on the third display device 105 indicating whether the third page is safe or unsafe for simultaneous display and editing on two or more display devices. At 304, the algorithm 400 determines whether the flag indicates that the third page is safe for simultaneous display and editing on two or more display devices. When the third page is flagged as safe, then the algorithm 400 proceeds to 306 and the processor 108 displays the first page on the first display device 102 with editing enabled.

When the third page is flagged as unsafe and the second page is flagged as safe, then the algorithm 400 proceeds to 308 with retrieving an identifier associated with the first page and 310 with retrieving an identifier associated with the third page. When the second page is flagged as unsafe, then step 308 is redundant with step 214 and can be skipped. At 312, the algorithm 400 determines whether the identifiers associated with the first page and the third page are the same. In other words, the algorithm 400 determines whether the first page and the third page are the same page. When the identifiers associated with the first page and the third page are the same, then the algorithm 400 proceeds to 314 and the processor 108 prohibits selection of the first page.

When the identifiers associated with the first page and the third page are not the same and the second page is flagged as safe, then the algorithm 400 proceeds to 316, with retrieving a group designator associated with the first page and 318 with retrieving a group designator associated with the third page. When the second page is flagged as unsafe, then step 316 is redundant with step 222 and can be skipped. At 320, the algorithm 400 determines whether the group designators associated with the first and third pages are the same. In other words, the algorithm 400 determines whether the first and third pages belong to the same group. When the group designators associated with the first and third pages are the same, then the algorithm 400 proceeds to 322 and the processor 108 prohibits selection of the first page. When the group designators associated with the first and third pages are different, then the algorithm 400 proceeds to 324 and the processor 108 displays the first page on the first display device 102 with editing enabled.

Figure 5:
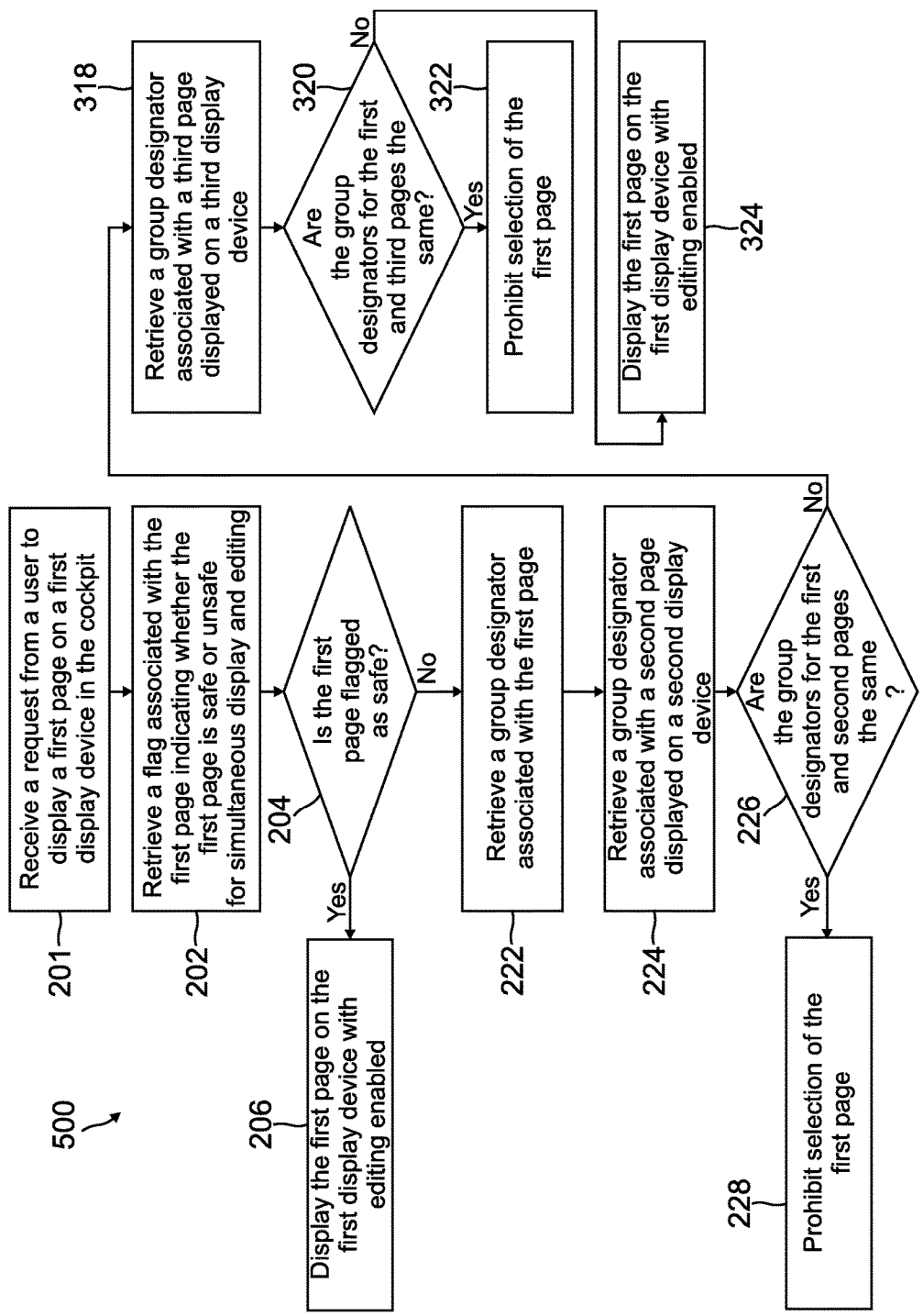
FIG. 5 illustrates a flow chart of exemplary logic executed by the display device control system for controlling three display devices according to one embodiment of the present disclosure.

FIG. 5 includes a flow chart illustrating a display device control algorithm according to one embodiment of the present disclosure. It should be understood that algorithm 500 may be implemented using any one of the embodiments described above in FIGS. 1-4C. As such, elements of algorithm 500 may be used in conjunction with, in combination with, or substituted for elements of the embodiments described above. Further, the functions, structures and other description of elements for such embodiments described above may apply to like named elements of algorithm 500 and vice versa.

In exemplary embodiments, algorithm 500 is for controlling three display devices as performed by the processor 108 executing the display device control instructions 114 in FIG. 1. Algorithm 500 includes similar steps to algorithm 400 and the similar steps have the same reference numerals. When executing algorithm 500, the processor 108 omits steps 208-220 discussed above with respect to FIGS. 2A-2B and 4A-4B. Accordingly, when the first page is flagged as unsafe, as determined at step 204, the algorithm 200 proceeds directly to 222 with retrieving a group designator associated with the first page and 224 with retrieving a group designator associated with the second page. When the group designators for the first and second pages are different, as determined at step 226, the algorithm 500 omits steps 302-316 and proceeds directly to 318-324 described above with respect to FIG. 4C. Algorithm 500 leverages that the information regarding the flag associated with the second page can be inferred based on the group designator associated with the second page and the information regarding the flag of the third page can be inferred based on the group designator associated with the third page. Further, the identifiers associated with the second and third pages may not provide any additional information necessary to determine whether or not the first page can be displayed.

While the algorithms 200, 300, 400, 500 are discussed with respect to systems having two or three displays, it should be understood that these algorithms can be incorporated into systems having more than three displays as well. In particular, the algorithms 200, 300, 400, 500 can be incorporated into or used as a model for algorithms for more than three displays.

Figure 6:
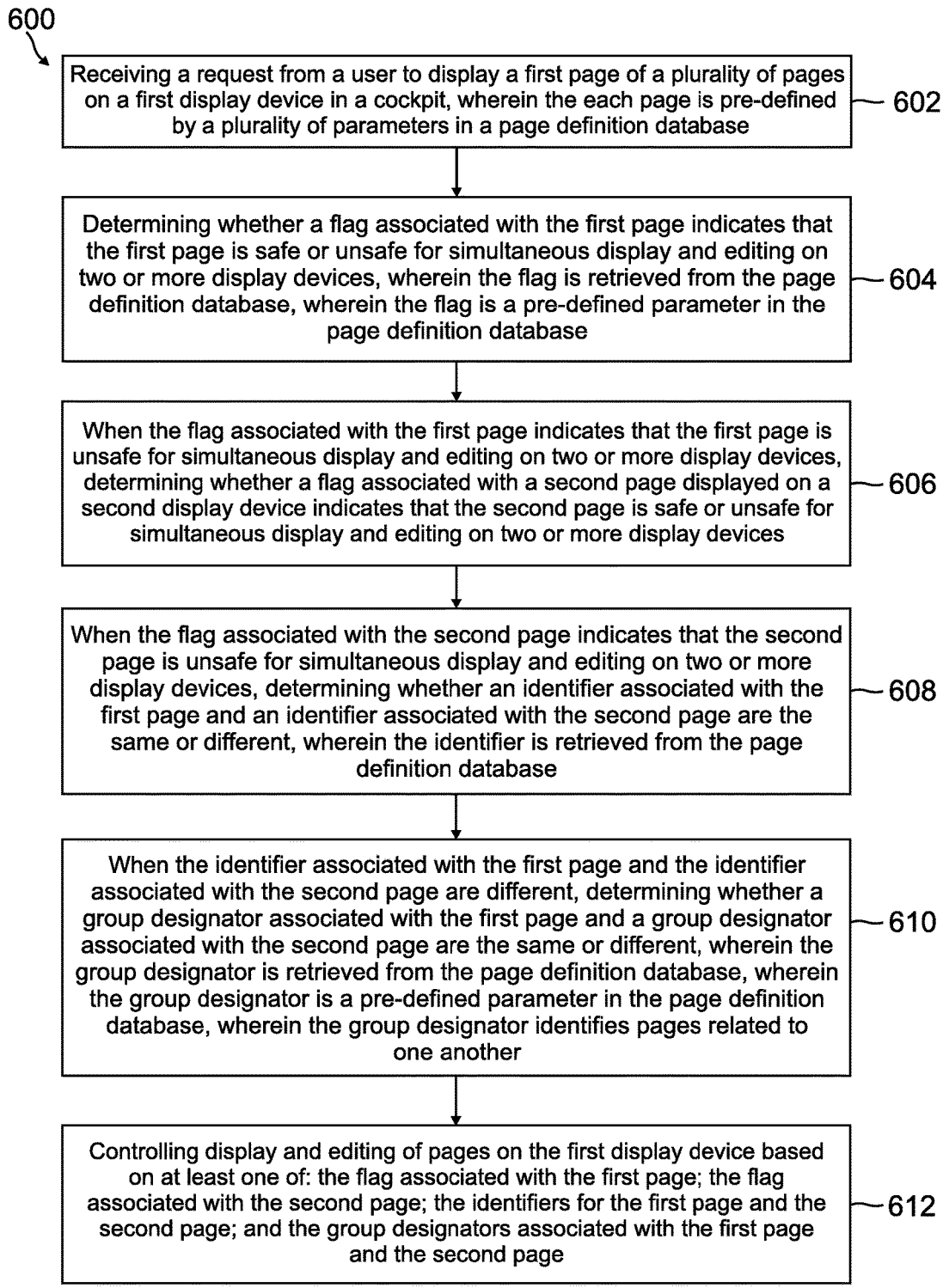
FIG. 6 is a flow chart illustrating an example method of managing multiple independent cockpit display devices according to one embodiment of the present disclosure.

FIG. 6 illustrates an example method 600 of managing multiple independent cockpit display devices according to one embodiment of the present disclosure. It should be understood that method 600 may be implemented using any one of the embodiments described above in FIG. 1-5. As such, elements of method 600 may be used in conjunction with, in combination with, or substituted for elements of the embodiments described above. Further, the functions, structures and other description of elements for such embodiments described above may apply to like named elements of method 600 and vice versa.

The method begins at 602 with receiving a request from a user to display a first page of a plurality of pages on a first display device in a cockpit, wherein the each page is pre-defined by a plurality of parameters in a page definition database.

The method proceeds to 604 with determining whether a flag associated with the first page indicates that the first page is safe or unsafe for simultaneous display and editing on two or more display devices, wherein the flag is retrieved from the page definition database, wherein the flag is a pre-defined parameter in the page definition database.

When the flag associated with the first page indicates that the first page is unsafe for simultaneous display and editing on two or more display devices, the method proceeds to 606 with determining whether a flag associated with a second page displayed on a second display device indicates that the second page is safe or unsafe for simultaneous display and editing on two or more display devices.

When the flag associated with the second page indicates that the second page is unsafe for simultaneous display and editing on two or more display devices, the method proceeds to 608 with determining whether an identifier associated with the first page and an identifier associated with the second page are the same or different.

When the identifier associated with the first page and the identifier associated with the second page are different, the method proceeds to 610 with determining whether a group designator associated with the first page and a group designator associated with the second page are the same or different, wherein the group designator is a pre-defined parameter in the plurality of parameters in the page definition database, wherein the group designator identifies pages related to one another.

The method proceeds to 612 with controlling display and editing of pages on the first display device based on at least one of: the flag associated with the first page; the flag associated with the second page; the identifiers for the first page and the second page; and the group designators associated with the first page and the second page.

Figure 7:
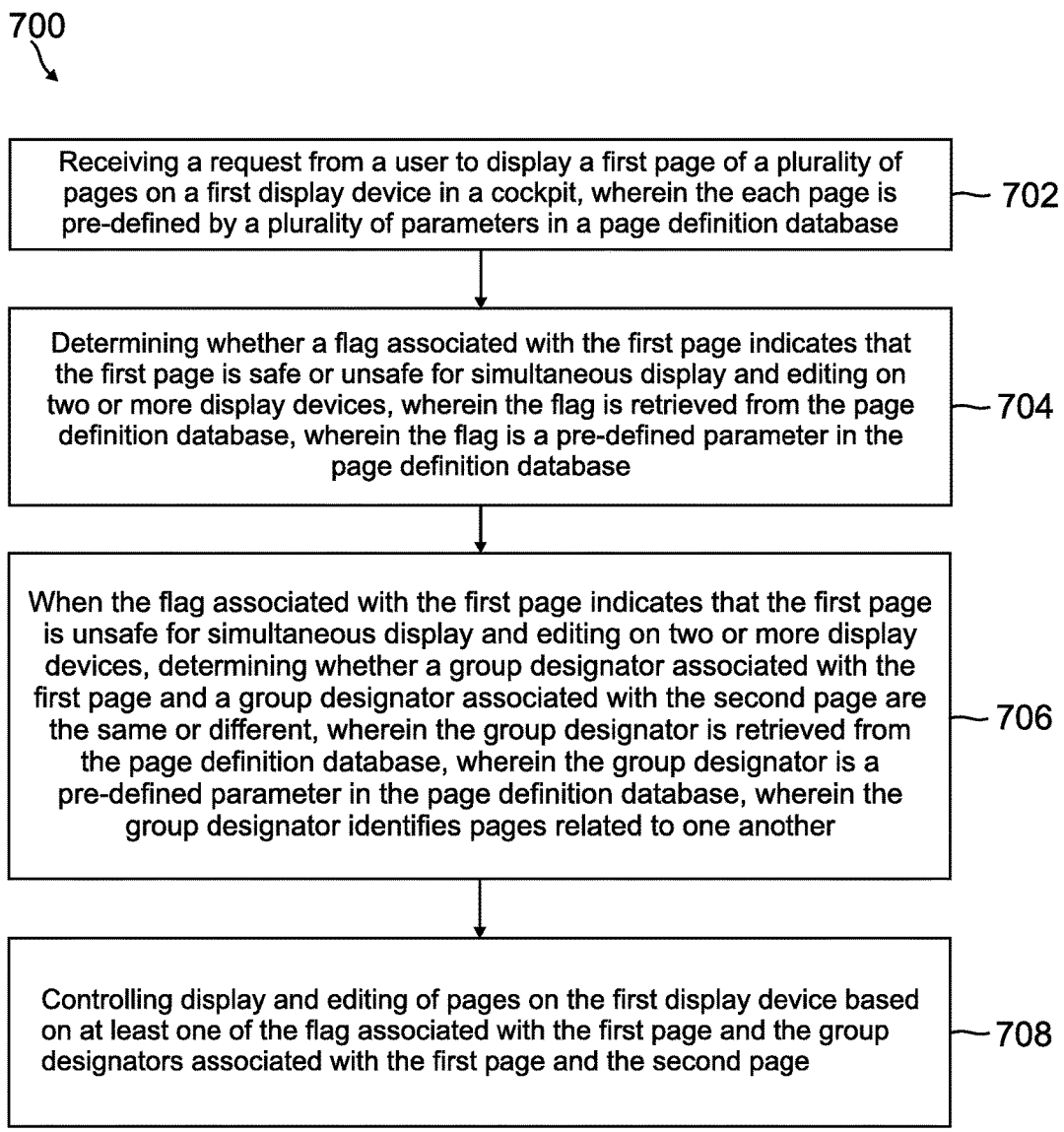
FIG. 7 is a flow chart illustrating an example method of managing multiple independent cockpit display devices according to one embodiment of the present disclosure.

FIG. 7 illustrates an example method 700 of managing multiple independent cockpit display devices according to one embodiment of the present disclosure. It should be understood that method 700 may be implemented using any one of the embodiments described above in FIG. 1-6. As such, elements of method 700 may be used in conjunction with, in combination with, or substituted for elements of the embodiments described above. Further, the functions, structures and other description of elements for such embodiments described above may apply to like named elements of method 700 and vice versa.

The method begins at 702 with receiving a request from a user to display a first page of a plurality of pages on a first display device in a cockpit, wherein the each page is pre-defined by a plurality of parameters in a page definition database.

The method proceeds to 704 with determining whether a flag associated with the first page indicates that the first page is safe or unsafe for simultaneous display and editing on two or more display devices, wherein the flag is retrieved from the page definition database, wherein the flag is a pre-defined parameter in the page definition database.

When the flag associated with the first page indicates that the first page is unsafe for simultaneous display and editing on two or more display devices, the method proceeds to 706 with determining whether a group designator associated with the first page and a group designator associated with the second page are the same or different, wherein the group designator is a pre-defined parameter in the plurality of parameters in the page definition database, wherein the group designator identifies pages related to one another.

The method proceeds to 708 with controlling display and editing of pages on the first display device based on at least one of: the flag associated with the first page, the group designator associated with the first page, and the group designator associated with second page.

The systems and methods described herein overcome the problems with AOC, ATC, and FMS

EXAMPLE EMBODIMENTS

Example 1 includes a system for managing multiple independent cockpit displays, comprising: a first display device and a second display device in a cockpit of an vehicle, where the first display device and the second display device are configured to receive input from a user and display pages to the user, wherein the pages are pre-defined by a plurality of parameters in a page definition database; a display device control system comprising a processor coupled to a memory, wherein the memory stores the page definition database, wherein the processor is configured to: receive a request from a user to display a first page on the first display device; retrieve a flag associated with the first page, wherein the flag is a pre-defined parameter in the page definition database, wherein the flag indicates whether a particular page is safe or unsafe for simultaneous display and editing on two or more display devices; retrieve a group designator associated with the first page and a group designator associated with a second page displayed on a second display device, wherein the group designator is a pre-defined parameter in the page definition database, wherein the group designator identifies pages that are related to one another; and control display and editing of pages on the first display device in response to the request based on at least one of: the flag associated with the first page, the group designator associated with the first page, and the group designator associated with the second page.

Example 2 includes the system of Example 1, wherein the processor is configured to display the first page on the first display device with editing enabled when: the flag associated with the first page indicates that the first page is safe for simultaneous display and editing on two or more display devices; or the group designator associated with the first page and the group designator associated with the second page are different.

Example 3 includes the system of any of Examples 1-2, wherein the processor is configured to prohibit selection of the first page when the group designator associated with the first page and the group designator associated with the second page are the same.

Example 4 includes the system of Example 3, wherein prohibit selection of the first page comprises at least one of: prohibit display of the first page on the first display device; display an error indication on the first display device; display the first page on the first display device with editing disabled; and display the first page on the first display device, the first page having at least one of a color and additional text indicating that the first page is unavailable for editing.

Example 5 includes the system of any of Examples 1-4, wherein the processor is further configured to: retrieve a flag associated with the second page displayed on the second display device; and display the first page on the first display device with editing enabled when the flag associated with the second page indicates that the second page is safe for simultaneous display and editing on two or more display devices.

Example 6 includes the system of any of Examples 1-4, wherein the processor is further configured to retrieve an identifier associated with the first page and an identifier associated with the second page when the flag associated with the first page and the flag associated with the second page indicate that the first page and the second page are unsafe for simultaneous display and editing on two or more display devices, wherein the identifier is retrieved from the page definition database.

Example 7 includes the system of Example 6, wherein the processor is configured to retrieve the group designator associated with the first page and the group designator associated with the second page when: the flag associated with the first page and the flag associated with the second page indicate that the first page and the second page are unsafe for simultaneous display and editing on two or more display devices; and the identifier associated with the first page and the identifier associated with the second page are different.

Example 8 includes the system of Example 7, wherein the processor is configured to display the first page on the first display device with editing enabled when the group designator associated with the first page and the group designator associated with the second page are different.

Example 9 includes the system of any of Examples 1-8, further comprising a third display device, wherein the processor is further configured to: retrieve a group designator associated with the third page; and control display and editing of pages on the first display device in response to the request based on the group designator associated with the third page.

Example 10 includes the system of Example 9, wherein the processor is further configured to retrieve a flag associated with the second page and a flag associated with the third page; wherein the processor is configured to display the first page on the first display device with editing enabled when: the flag associated with the first page indicates that the first page is unsafe for simultaneous display and editing on two or more display devices; the flag associated with the second page indicates that the second page is safe for simultaneous display and editing on two or more display devices; and the flag associated with the third page indicates that the third page is safe for simultaneous display and editing on two or more display devices.

Example 11 includes the system of Example 10, wherein the processor is configured to retrieve the flag associated with the third page when: the flag associated with the first page indicates that the first page is unsafe for simultaneous display and editing on two or more display devices and the flag associated with the second page indicates that the second page is safe for simultaneous display and editing on two or more display devices; or the flag associated with the first page and the flag associated with the second page indicate that the first page and the second page are unsafe for simultaneous display and editing on two or more display devices and the group designators associated with the first page and the second page are different.

Example 12 includes the system of Examples 11, wherein the processor is further configured to retrieve an identifier of the first page and an identifier of the third page; wherein the processor is configured to prohibit selection of the first page when: the identifier of the first page and the identifier of the third page are the same; or the group designator associated with the first page and the group designator associated with the third page are the same.

Example 13 includes a method for managing multiple independent display devices in a cockpit, the method comprising: receiving a request from a user to display a first page of a plurality of pages on a first display device in a cockpit, wherein the plurality of pages are pre-defined by a plurality of parameters in a page definition database; determining whether a flag associated with the first page indicates that the first page is safe or unsafe for simultaneous display and editing on two or more display devices, wherein the flag is retrieved from the page definition database, wherein the flag is a pre-defined parameter in the page definition database; when the flag associated with the first page indicates that the first page is unsafe for simultaneous display and editing on two or more display devices, determining whether a group designator associated with the first page and a group designator associated with the second page are the same or different, wherein the group designator is retrieved from the page definition database, wherein the group designator is a pre-defined parameter in the page definition database, wherein the group designator identifies pages related to one another; and controlling display and editing of pages on the first display device based on at least one of: the flag associated with the first page and the group designators associated with the first page and the second page.

Example 14 includes the method of Example 13, further comprising displaying the first page on the first display device with editing enabled when the flag associated with the first page indicates that the first page is safe for simultaneous display and editing on two or more display devices.

Example 15 includes the method of any of Examples 13-14, further comprising prohibiting selection of the first page when the group designator associated with the first page and the group designator associated with the second page are the same.

Example 16 includes the method of any of Examples 13-15, further comprising displaying the first page on the first display device with editing enabled when the group designator associated with the first page and the group designator associated with the second page are different.

Example 17 includes the method of any of Examples 13-16, further comprising: when the flag associated with the first page indicates that the first page is unsafe for simultaneous display and editing on two or more display devices, determining whether a flag associated with a second page displayed on a second display device indicates that the second page is safe or unsafe for simultaneous display and editing on two or more display devices; and displaying the first page on the first display device with editing enabled when the flag associated with the second page indicates that the second page is safe for simultaneous display and editing on two or more display devices.

Example 18 includes the method of Example 17, further comprising: when the flag associated with the first page indicates that the first page is unsafe for simultaneous display and editing on two or more display devices and the flag associated with the second page indicates that the second page is unsafe for simultaneous display and editing on two or more display devices, determining whether an identifier associated with the first page and an identifier associated with the second page are the same, wherein the identifier is retrieved from the page definition database; and prohibiting selection of the first page when the identifier associated with the first page and the identifier associated with the second page are the same.

Example 19 includes the method of any of Examples 17-18, further comprising: when the group designator associated with the first page and the group designator associated with the second page are different, determining whether a group designator associated with the first page and a group designator associated with the third page displayed on a third display device are the same; and displaying the first page on the first display device with editing enabled when the group designators associated with the first page and the third page are different.

Example 20 includes the method of Example 19, further comprising: when the flag associated with the first page indicates that the first page is unsafe for simultaneous display and editing on two or more display devices and the flag associated with the second page indicates that the second page is safe for simultaneous display and editing on two or more display devices, determining whether a flag associated with the third page indicates that the third page is safe or unsafe for simultaneous display and editing on two or more display devices; and displaying the first page on the first display device with editing enabled when the flag associated with the third page indicates that the third page is safe for simultaneous display and editing on two or more display devices.

In various alternative embodiments, system elements, method steps, or examples described throughout this disclosure (such as the display device control system, or sub-parts thereof, for example) may be implemented using one or more computer systems, field programmable gate arrays (FPGAs), or similar devices comprising a processor coupled to a memory (such as shown in FIG. 1, for example) and executing code to realize those elements, processes, or examples, said code stored on a non-transient data storage device. Therefore other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system for managing multiple independent cockpit displays, comprising:
   a first display device and a second display device in a cockpit of a vehicle, wherein the first display device and the second display device are configured to receive input from a user and display pages to the user, wherein the pages are pre-defined by a plurality of parameters in a page definition database;
   a display device control system comprising a processor coupled to a memory, wherein the memory stores the page definition database, wherein the processor is configured to:
      receive a request from a user to display a first page on the first display device;
      retrieve a flag associated with the first page, wherein the flag is a pre-defined parameter in the page definition database, wherein the flag indicates whether a particular page is safe or unsafe for simultaneous display and editing on two or more display devices;
      when the flag associated with the first page indicates that the first page is unsafe for simultaneous display and editing on two or more display devices, retrieve a group designator associated with the first page and a group designator associated with a second page displayed on a second display device, wherein a group designator is a pre-defined parameter in the page definition database, wherein a group designator identifies pages that are related to one another; and
      control display and editing of pages on the first display device in response to the request based on:
         the flag associated with the first page; or
         the flag associated with the first page, the group designator associated with the first page, and the group designator associated with the second page;
   wherein the processor is configured to display the first page on the first display device with editing enabled when the group designator associated with the first page and the group designator associated with the second page are different; and
   wherein the processor is configured to prohibit selection of the first page when the group designator associated with the first page and the group designator associated with the second page are the same.

2. The system of claim 1, wherein the processor is configured to display the first page on the first display device with editing enabled when:
   the flag associated with the first page indicates that the first page is safe for simultaneous display and editing on two or more display devices.

3. The system of claim 1, wherein prohibit selection of the first page comprises at least one of:
   prohibit display of the first page on the first display device;
   display an error indication on the first display device;
   display the first page on the first display device with editing disabled; and
   display the first page on the first display device, the first page having at least one of a color and additional text indicating that the first page is unavailable for editing.

4. The system of claim 1, wherein the processor is further configured to:
   retrieve a flag associated with the second page displayed on the second display device; and
   display the first page on the first display device with editing enabled when the flag associated with the second page indicates that the second page is safe for simultaneous display and editing on two or more display devices.

5. The system of claim 4, wherein the processor is further configured to retrieve an identifier associated with the first page and an identifier associated with the second page when the flag associated with the first page and the flag associated with the second page indicate that the first page and the second page are unsafe for simultaneous display and editing on two or more display devices, wherein the identifier is retrieved from the page definition database.

6. The system of claim 5, wherein the processor is configured to retrieve the group designator associated with the first page and the group designator associated with the second page when:
   the flag associated with the first page and the flag associated with the second page indicate that the first page and the second page are unsafe for simultaneous display and editing on two or more display devices; and
   the identifier associated with the first page and the identifier associated with the second page are different.

7. The system of claim 1, further comprising a third display device, wherein the processor is further configured to:
   retrieve a group designator associated with the third page; and
   control display and editing of pages on the first display device in response to the request based on the group designator associated with the third page.

8. The system of claim 7, wherein the processor is further configured to retrieve a flag associated with the second page and a flag associated with the third page;
   wherein the processor is configured to display the first page on the first display device with editing enabled when:
      the flag associated with the first page indicates that the first page is unsafe for simultaneous display and editing on two or more display devices;
      the flag associated with the second page indicates that the second page is safe for simultaneous display and editing on two or more display devices; and
      the flag associated with the third page indicates that the third page is safe for simultaneous display and editing on two or more display devices.

9. The system of claim 8, wherein the processor is configured to retrieve the flag associated with the third page when:
   the flag associated with the first page indicates that the first page is unsafe for simultaneous display and editing on two or more display devices and the flag associated with the second page indicates that the second page is safe for simultaneous display and editing on two or more display devices; or
   the flag associated with the first page and the flag associated with the second page indicate that the first page and the second page are unsafe for simultaneous display and editing on two or more display devices and the group designators associated with the first page and the second page are different.

10. The system of claim 9, wherein the processor is further configured to retrieve an identifier of the first page and an identifier of the third page;
    wherein the processor is configured to prohibit selection of the first page when:
        the identifier of the first page and the identifier of the third page are the same; or
        the group designator associated with the first page and the group designator associated with the third page are the same.

11. A method for managing multiple independent display devices in a cockpit, the method comprising:
    receiving a request from a user to display a first page of a plurality of pages on a first display device in a cockpit, wherein the plurality of pages are pre-defined by a plurality of parameters in a page definition database;
    determining whether a flag associated with the first page indicates that the first page is safe or unsafe for simultaneous display and editing on two or more display devices, wherein the flag is retrieved from the page definition database, wherein the flag is a pre-defined parameter in the page definition database;
    when the flag associated with the first page indicates that the first page is unsafe for simultaneous display and editing on two or more display devices, determining whether a group designator associated with the first page and a group designator associated with a second page displayed on a second display device in the cockpit are the same or different, wherein the group designator is retrieved from the page definition database, wherein a group designator is a pre-defined parameter in the page definition database, wherein a group designator identifies pages related to one another;
    controlling display and editing of pages on the first display device based on:
        the flag associated with the first page; or
        the flag associated with the first page and the group designators associated with the first page and the second page;
    displaying the first page on the first display device with editing enabled when the group designator associated with the first page and the group designator associated with the second page are different; and
    prohibiting selection of the first page when the group designator associated with the first page and the group designator associated with the second page are the same.

12. The method of claim 11, further comprising displaying the first page on the first display device with editing enabled when the flag associated with the first page indicates that the first page is safe for simultaneous display and editing on two or more display devices.

13. The method of claim 11, further comprising:
    when the flag associated with the first page indicates that the first page is unsafe for simultaneous display and editing on two or more display devices, determining whether a flag associated with a second page displayed on a second display device indicates that the second page is safe or unsafe for simultaneous display and editing on two or more display devices; and
    displaying the first page on the first display device with editing enabled when a flag associated with the second page indicates that the second page is safe for simultaneous display and editing on two or more display devices.

14. The method of claim 13, further comprising:
    when the flag associated with the first page indicates that the first page is unsafe for simultaneous display and editing on two or more display devices and the flag associated with the second page indicates that the second page is unsafe for simultaneous display and editing on two or more display devices, determining whether an identifier associated with the first page and an identifier associated with the second page are the same, wherein the identifier is retrieved from the page definition database; and
    prohibiting selection of the first page when the identifier associated with the first page and the identifier associated with the second page are the same.

15. The method of claim 13, further comprising:
    when the group designator associated with the first page and the group designator associated with the second page are different, determining whether a group designator associated with the first page and a group designator associated with a third page displayed on a third display device are the same; and
    displaying the first page on the first display device with editing enabled when the group designators associated with the first page and the third page are different.

16. The method of claim 15, further comprising:
    when the flag associated with the first page indicates that the first page is unsafe for simultaneous display and editing on two or more display devices and the flag associated with the second page indicates that the second page is safe for simultaneous display and editing on two or more display devices, determining whether a flag associated with the third page indicates that the third page is safe or unsafe for simultaneous display and editing on two or more display devices; and
    displaying the first page on the first display device with editing enabled when the flag associated with the third page indicates that the third page is safe for simultaneous display and editing on two or more display devices.

* * * * *